US012566484B2

(12) United States Patent
Chavagnat et al.

(10) Patent No.: US 12,566,484 B2
(45) Date of Patent: Mar. 3, 2026

(54) SUPPLY CURRENT CONSUMPTION ACQUISITION SYNCHRONIZED WITH DEBUG DATA TRACE

(71) Applicant: STMicroelectronics International N.V., Geneva (CH)

(72) Inventors: Sylvain Chavagnat, Saint Nicolas de Macherin (FR); Simon Valcin, Trets (FR)

(73) Assignee: STMicroelectronics International N.V., Geneva (CH)

( * ) Notice: Subject to any disclaimer, the term of this patent is extended or adjusted under 35 U.S.C. 154(b) by 75 days.

(21) Appl. No.: 18/740,786

(22) Filed: Jun. 12, 2024

(65) Prior Publication Data

US 2024/0329719 A1     Oct. 3, 2024

Related U.S. Application Data

(63) Continuation of application No. 18/081,011, filed on Dec. 14, 2022, now Pat. No. 12,038,801.

(51) Int. Cl.
*G06F 1/32* (2019.01)
*G06F 1/3234* (2019.01)

(52) U.S. Cl.
CPC .................................. *G06F 1/3243* (2013.01)

(58) Field of Classification Search
CPC ..................................................... G06F 1/3243
See application file for complete search history.

(56) References Cited

U.S. PATENT DOCUMENTS 7,987,393 B2     7/2011   Sohm et al.
8,589,927 B2     11/2013  Williams et al.
(Continued)

FOREIGN PATENT DOCUMENTS

CN      113360440 A     9/2021
KR      100869953 B1    11/2008
WO      2022152806 A1   7/2022

OTHER PUBLICATIONS

Scherer, Balazs, et al: "Trace and Debug Port Based Watchdog Processor," Article in Conference Record—IEEE Instrumentation and Measurement Technology Conference, May 2012, 5 pgs.

*Primary Examiner* — Stefan Stoynov
(74) *Attorney, Agent, or Firm* — Crowe & Dunlevy LLC

(57) ABSTRACT

A method is for synchronizing power consumption data with trace data in a microcontroller debugging system. The method involves periodically sending synchronization requests from a host device to a synchronization manager within a debug probe. The synchronization manager retrieves the current power acquisition cycle number from a power acquisition circuit in response to each request, corresponding to a current sample of microcontroller power consumption. Each synchronization request, along with the retrieved cycle number, is sent to a protocol manager, which transmits the request to a microcontroller's debug-port. Upon receiving acknowledgment from the microcontroller, the protocol manager communicates these to the synchronization manager. The synchronization manager measures the latency between sending each synchronization request and receiving its acknowledgment, which is indicative of synchronization quality. Lower latency indicates higher synchronization quality, and higher latency indicates lower synchronization quality. This provides precise alignment of power consumption data with trace data for accurate debugging.

18 Claims, 5 Drawing Sheets

(56)  References Cited

U.S. PATENT DOCUMENTS

| 10,812,350 | B2 | 10/2020 | Bugge et al. | |
|---|---|---|---|---|
| 2005/0044438 | A1* | 2/2005 | Nonogaki | G06F 11/3062 |
| | | | | 713/340 |
| 2009/0254767 | A1* | 10/2009 | Ford | G06F 1/3203 |
| | | | | 713/320 |
| 2015/0378423 | A1* | 12/2015 | Hanssen | G06F 1/3296 |
| | | | | 713/323 |
| 2016/0349326 | A1 | 12/2016 | Grafton et al. | |
| 2022/0026490 | A1 | 1/2022 | Styles | |

* cited by examiner

Data Stream at Host

COMP0 0x0
TS 0x131f012f
ITM0 0x195bd
TS 0x13866f44
COMP0 0x1
TS 0x13a34c53
COMP0 0x0
TS 0x14279785
COMP0 0x1
TS 0x14abe2a9
COMP0 0x0
TS 0x15302ddb
ITM0 0x1d722
TS 0x1538a98d
COMP0 0x1
TS 0x15b478fe Sync Power Debug

SUPPLY CURRENT CONSUMPTION ACQUISITION SYNCHRONIZED WITH DEBUG DATA TRACE

RELATED APPLICATION

This application is a continuation of U.S. patent application Ser. No. 18/081,011, filed Dec. 14, 2022, the content of which is incorporated by reference in its entirety.

TECHNICAL FIELD

This disclosure is related to the field of power consumption monitoring of components within microcontrollers and, in particular, to a debug probe and associated firmware that is able to accurately synchronize a debug trace with a measurement of current draw.

BACKGROUND

System-on-chip devices (SOCs) are now in wide use in electronic devices. SOCs generally include a processor, one or more modules, memory devices, and one or more system busses for communication between the processor, modules, and memory devices. Because multiple modules and their communications occur internally to the chip, access to this information is generally difficult when problems occur in software or hardware. Thus, debugging on these systems is not straightforward. As a result of development of these SOCs, specialized debugging systems have been developed to monitor performance and trace information on the chip. Such systems typically include dedicated hardware or software such as a debug tool and debug software which accesses a processor through serial communications.

Among the various uses of these debugging systems is the attempt to correlate supply current draw (e.g., power consumption) with the debug data from a debug trace. This may be used, for example, to correlate SOC components and functions, processes, programs, and code portions to high power consumption. By making this correlation, suitable targets for power consumption or heat management optimization can be identified.

Conventionally, a host computer in communication with the debug probe aligns current draw and the debug trace in a log which can be displayed to the user. An ideal case is illustrated in FIG. 1, showing current values over time (e.g., samples of the current drawn by a microcontroller including the SOC) and the associated current sample numbers (e.g., the sample number of each current sample) aligned with trace data over time about sensing operations (e.g., humidity, temperature, pressure, accelerometer) from the debug trace. Through this alignment, the power draw of the different types of sensing can be observed. For example, notice the current value during the period when humidity sensing is active (Humidity showing a value of 80) is less than the current values when temperature sensing (Temperature showing a value of 25) and pressure sensing (Pressure showing a value of 990) are active, and is substantially less than the current value when acceleration sensing (Accelerometer showing a value of 100) is active.

From this, it can be seen that acceleration sensing is a good target for power consumption optimization, while humidity sensing is already well optimized. This information helps developers identify where to expend development resources.

Assuming the current values and the trace data can routinely be accurately aligned as in FIG. 1, the conventional debug tools and techniques are effective. However, as stated, FIG. 1 is an ideal case. Using conventional techniques to perform alignment, the current draw and debug traces are often not well aligned by the host computer because the current draw and debug traces are logged as they arrive. For example, the consumption (current values) may be shifted with respect to the "SVCall" function within the trace data. This level of misalignment would be typical. While this would permit general inferences to be made about current consumption and current SOC operation, the misalignment would make specific inferences difficult to draw—the closer the alignment, the more specific the inferences that can be drawn, while the greater the misalignment, the more general the inferences that can be drawn.

In the quest for SOC operating efficiency, the possibility for such misalignment presents an issue. As such, further development into debug probes and the handling of data therefrom is necessary in order to provide for the drawing of accurate specific inferences that can be used to increase operating efficiency of the SOC.

SUMMARY

Disclosed herein is a system, including: a microcontroller including a microprocessor; a debug probe; and a host. The host is configured to, upon startup of the microcontroller, send debug instructions to the debug probe that, when executed by the microcontroller, begin execution of a debug trace within the microcontroller. The debug probe is configured to send the debug instructions to the microcontroller. The microcontroller is configured to execute the debug trace according to the debug instructions to generate trace data, the trace data including trace data time stamps.

The debug probe is further configured to receive a power signal from the host and sample the power signal and provide the power signal to the microcontroller, with each sampling of the power signal occurring during a different power acquisition cycle.

The host is further configured to periodically send synchronization requests to the debug probe.

The debug probe is further configured to, in response to receipt of each synchronization request: retrieve a current power acquisition cycle number; generate an intermediate synchronization request; and send the intermediate synchronization request to the microcontroller.

The microcontroller is further configured to, in response to receipt of each intermediate synchronization request, send a message to the debug probe, the message including a current execution cycle number of the microprocessor and an associated cycle number time stamp.

The debug probe is further configured to: send the trace data to the host; send the messages to the host; and send the sampled power signal to the host.

The host is configured to: determine a trace data time stamp within the trace data where the sampling of the power signal began; derive a frequency of the microprocessor from the trace data; determine a ratio between a sampling rate of the power signal and the frequency of the microprocessor; and align the trace data and the samples of the power signal based upon the ratio and the trace data time stamp within the trace data where the sampling of the power signal began.

The debug probe may include a power acquisition circuit that samples the power signal.

The debug probe may include a protocol manager that retrieves the current power acquisition cycle number, generates the intermediate synchronization request, sends the intermediate synchronization request to the microcontroller, sends the trace data to the host, sends the messages to the host, and sends the sampled power signal to the host.

The protocol manager may send the intermediate synchronization request to the microcontroller via a serial wire debug (SWD) protocol. The microcontroller may send the message to the debug probe via a UART protocol (SWO) and send the trace data to the debug probe via the SWD protocol.

The message may be generated within an instrument trace macrocell (ITM) within the microcontroller.

The debug probe may include a power acquisition circuit that samples the power signal. The microcontroller may be further configured to, upon receipt of each intermediate synchronization request, send a request acknowledgement to the debug probe. The synchronization manager may be further configured to measure a number of power acquisition cycles between sending of each intermediate synchronization request and receipt of each request acknowledgement, and determine a latency based thereupon. The latency may be indicative of accuracy in the alignment between the trace data and the samples of the power signal.

Also disclosed herein is a method of aligning trace data and power consumption data in a debugging system. The method includes: sending debug instructions to a microcontroller within the debug system, the debug instructions, when executed by the microcontroller, begin execution of a debug trace; and receiving a power signal from a host within the debug system; sampling the power signal and provide the power signal to the microcontroller, with each sampling of the power signal occurring during a different power acquisition cycle.

The method further includes in response to receipt of each of a number of periodic synchronization requests: retrieving a current power acquisition cycle number; generating an intermediate synchronization request; and sending the intermediate synchronization request to the microcontroller.

The method further includes: receiving trace data from the microcontroller, the trace data including trace data time stamps; receiving from the microcontroller, in response to the sending of each intermediate synchronization request, a message, the message including a current execution cycle number of a microprocessor within the microcontroller and an associated cycle number time stamp; sending the trace data to the host, sending the messages to the host, and sending the sampled power signal to the host so that the host aligns the trace data and the samples of the power signal based upon a trace data time stamp within the trace data where the sampling of the power signal began and a ratio between a sampling rate of the power signal and a frequency of the microprocessor.

The method may include deriving the frequency of the microprocessor from the trace data.

The method may further include: in response to the sending of each intermediate synchronization request to the microcontroller, receiving a request acknowledgement; measuring a number of power acquisition cycles between the sending of each intermediate synchronization request and receipt of each request acknowledgement, and determining a latency based thereupon. Accuracy in the alignment between the trace data and the samples of the power signal may be determined from the latency.

Also disclosed herein is a method of aligning trace data and power consumption data in a debugging system. The method includes: upon startup of a microcontroller within the debugging system, sending debug instructions from a host within the debugging system to a debug probe within the debugging system that, when executed by the microcontroller, begin execution of a debug trace; transmitting the debug instructions from the debug probe to the microcontroller; executing the debug trace at the microcontroller according to said debug instructions to generate trace data, the trace data including trace data time stamps; receiving a power signal, at the debug probe, from the host; sampling the power signal at the debug probe and providing the power signal to the microcontroller, with each sampling of the power signal occurring during a different power acquisition cycle; and periodically sending synchronization requests from the host to the debug probe.

The method further includes in response to receipt of each synchronization request at the debug probe: retrieving a current power acquisition cycle number; generating an intermediate synchronization request; and sending the intermediate synchronization request from the debug probe to the microcontroller.

The method further includes, in response to receipt of each intermediate synchronization request at the microcontroller, sending a message to the debug probe, the message including a current execution cycle number of a microprocessor within the microcontroller and an associated cycle number time stamp.

The method further includes: sending the trace data from the debug probe to the host; sending the messages from the debug probe to the host; sending the sampled power signal from the debug probe to the host; determining a trace data time stamp within the trace data where the sampling of the power signal began, at the host; deriving a frequency of the microprocessor from the trace data, at the host; determining a ratio between a sampling rate of the power signal and the frequency of the microprocessor, at the host; and aligning the trace data and the samples of the power signal based upon the ratio and the trace data time stamp within the trace data where the sampling of the power signal began, at the host.

The method may further include: upon receipt of each intermediate synchronization request at the microcontroller, sending a request acknowledgement to the debug probe; and measuring a number of power acquisition cycles between sending of each intermediate synchronization request and receipt of each request acknowledgement at the debug probe, and determining a latency based thereupon.

The latency is indicative of accuracy in the alignment between the trace data and the samples of the power signal.

DETAILED DESCRIPTION

The following disclosure enables a person skilled in the art to make and use the subject matter disclosed herein. The general principles described herein may be applied to embodiments and applications other than those detailed above without departing from the spirit and scope of this disclosure. This disclosure is not intended to be limited to the embodiments shown, but is to be accorded the widest scope consistent with the principles and features disclosed or suggested herein.

A debug probe, generally speaking, translates commands received from a host device (e.g., a PC) according to a protocol utilized by a microcontroller. The protocol utilized by the microcontroller may be based on the Joint Test Action Group (JTAG) protocol or based upon the Serial Wire Debug (SWD) protocol, with it being understood that the SWD protocol is specific to microcontrollers with ARM-based central processing units (CPUs) and utilizes two lines/pins for data communications. The two lines/pins utilized by SWD are Serial Wire Data Input Output (SWDIO), over which data is serially communicated, and Serial Wire Clock (SWCLK), over which the clock signal is transmitted. SWD may optionally include a Serial Wire Output (SWO) line/ pin, over which the CPU may output specific data in simplex according to a suitable protocol (e.g., Manchester, Universal Asynchronous Receiver Transmitter (UART)).

Real-time debugging (as opposed to breakpoint or single-step debugging) is commonly performed in cases where a processor cannot be stopped or a system crash would occur, or in cases where characteristics of the microcontroller (e.g., power consumption) are to observed during real-time operation. A debug "trace" follows a program's flow and data progression as it is executed by the microcontroller. An on-chip Instrument Trace Macrocell (ITM) or Embedded Trace Macrocell (ETM) may transmit the trace directly to the debug probe through the SWD, or may buffer the trace and then the buffered trace is transmitted to the debug probe. The debug probe in turn provides the trace to the host device.

Figure 1:
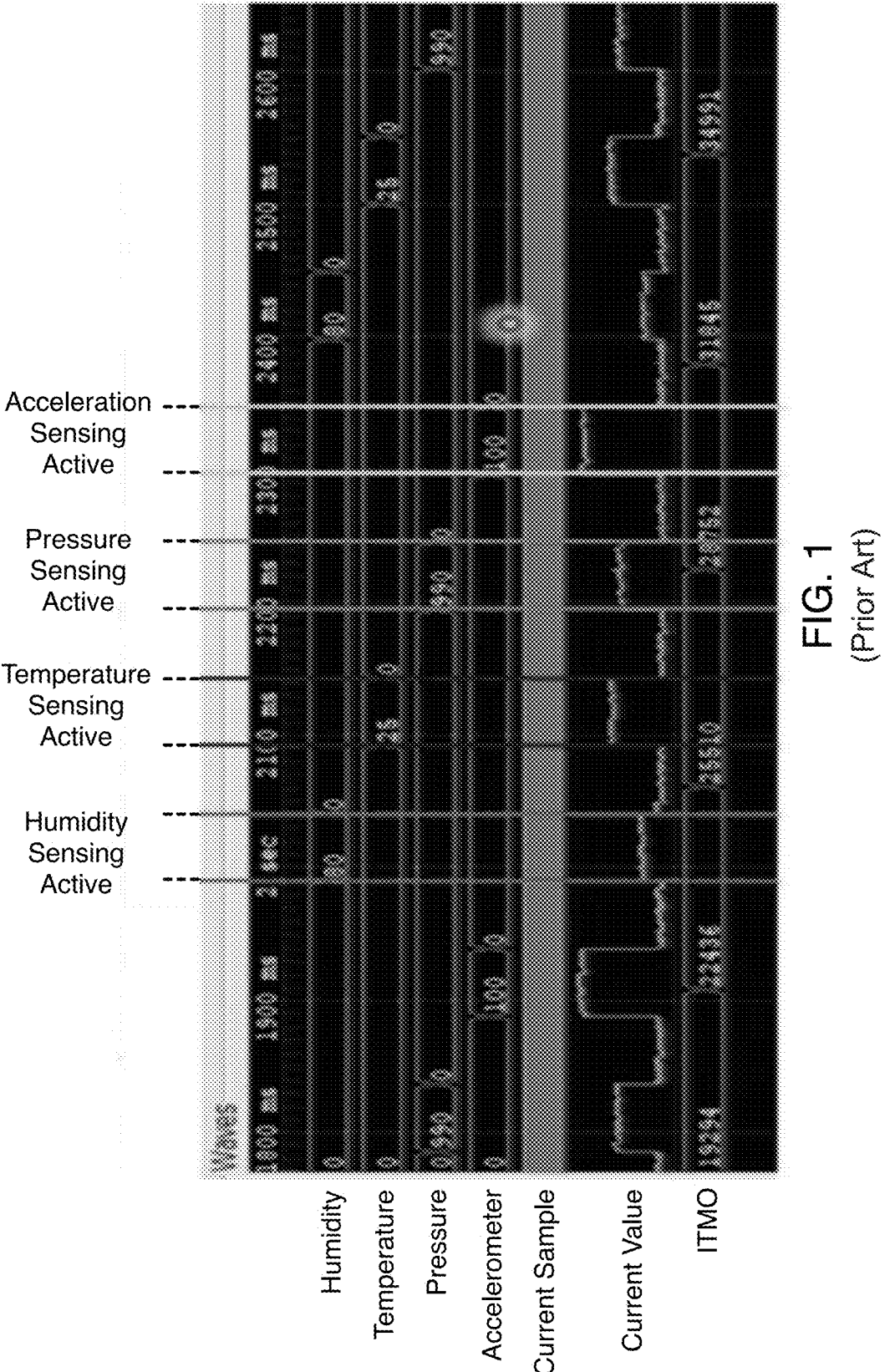
FIG. 1 is a graph showing a rough attempt at alignment between debug trace data and power acquisition samples, as performed by prior art systems.
Figures 2, 3:
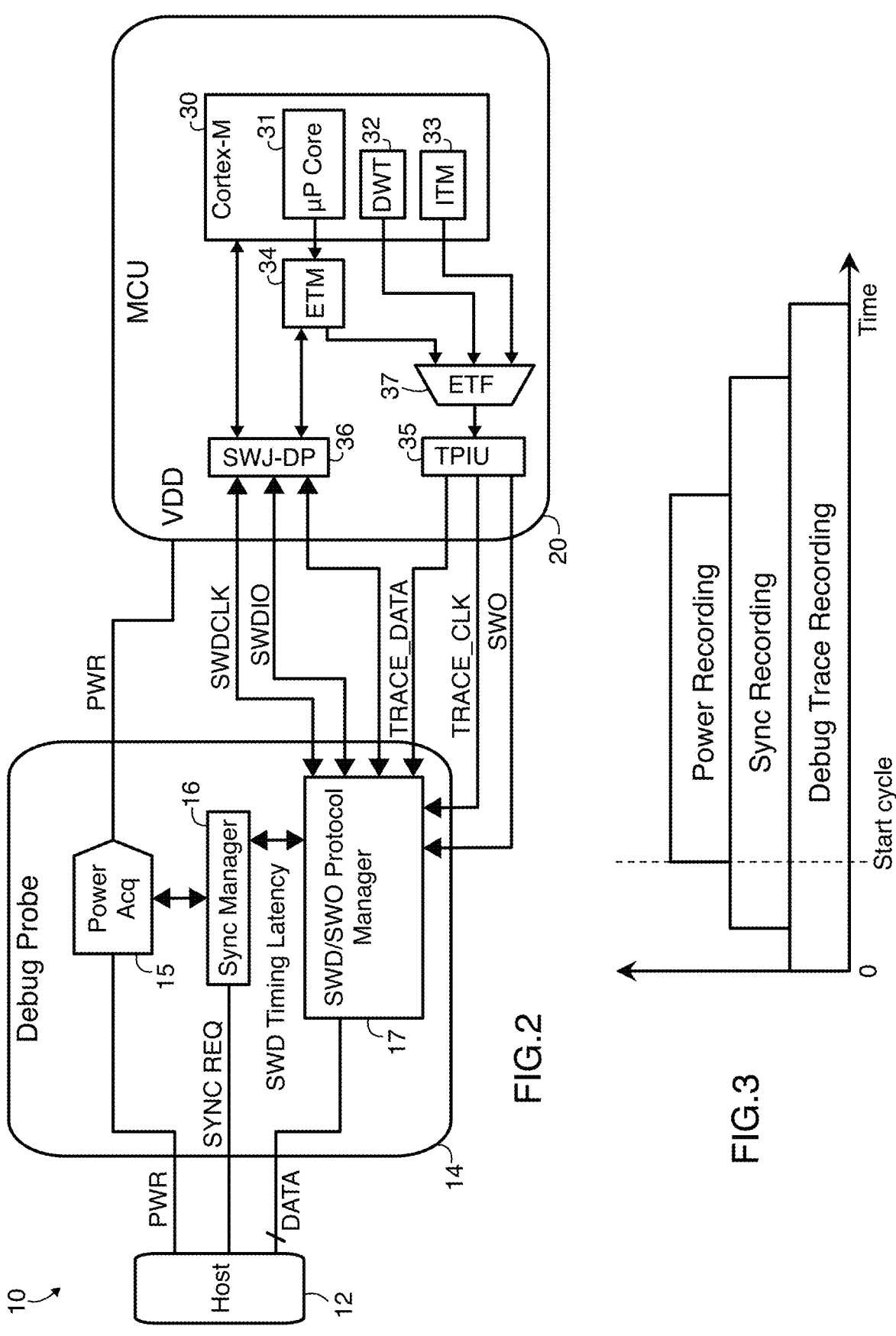
FIG. 2 is a block diagram of a debugging system described herein.
FIG. 3 is a diagram showing the relative start times of debug trace recording, synchronization message recording, and power consumption recording, during debug operations of the debugging system of FIG. 2.

As explained earlier herein, it is desired for the trace data to be synchronized with measures of current draw. Now described with initial reference to FIG. 2 is a debugging system 10 including a host device 12, debug probe 14, and microcontroller (MCU) 20, designed so as to provide for synchronization between trace data (SWDIO, SWO) and measures of current draw (PWR).

The host device 12 may be, for example, a computer, and provides a power output PWR to the debug probe 14.

The debug probe 14 includes a power acquisition circuit 15 that receives the power output PWR from the host computer 12 and provides it to the microcontroller 20 while sampling the power consumed by the microcontroller 20. A power acquisition cycle is the period during which a single sample of the output power PWR is sampled. Note that the sampling rate of the output power PWR is different than the data transmission rate of trace data (SWDIO, SWO).

The debug probe 14 also includes a synchronization manager 16 that receives synchronization requests SYNC REQ from the host computer 12 (the SYNC REQs to be explained in detail below) and is in bidirectional communications with the power acquisition circuit 15 and a protocol manager 17. The protocol manager 17 receives the SWDIO data and SWO data, as well as the clock SWCLK and provides output therefrom to the host computer 12. The protocol manager 17 also receives the trace data TRACE_DATA and trace clock TRACE_CLK and provides output therefrom to the host computer 12.

The microcontroller 20 includes an ARM Cortex-M based microprocessor 30, such as a Cortex-M0, Cortex-M0+, Cortex-M1, Cortex-M3, Cortex-M4, Cortex-M7, Cortex-M23, Cortex-M33, Cortex-M35P, Cortex-M55, Cortex-M85, etc.

The microprocessor 30 includes at least one processing core 31, a data watchpoint and trace unit (DWT) 32, and an instrumentation trace macrocell (ITM) 33. The microcontroller 20 includes, external to the microprocessor 30, an embedded trace macrocell (ETM) 34, a trace funnel (ETF) 37, a trace port interface unit (TPIU) 35, and a CoreSight debug port (SWJ-DP, enabling communication via JTAG or SWD) 36.

In general, in operation, trace information is generated from the ETM 34, ITM 33, and DWT 32, and then collected by the trace funnel ETF 37. The TPIU 35 formats the data from these trace sources into packets and sends that data to the protocol manager 17 of the debug probe 14. The ITM 33 has a capability to provide a "printf" style console message interface to the debug probe 14, for example via SWO. The ITM 33 also transfers the messages of the DWT 32, and the ITM 33 can generate timestamp packets which are inserted into the trace stream. The DWT 32 has multiple functionalities and provides profiling and timing verification, and may trigger the ETM 34.

The ETM 34 is used for providing instruction traces. To reduce the amount of data generated, the ETM 34 does not always output precisely what addresses the processing core 31 has reached/executed. The ETM 34 may output information about program flow, such as how many instructions were executed or skipped since the last message, and may output full addresses, or changes in address changes.

The ETM 34 outputs are routed to the TPIU 35, which transmits them to the protocol manager 17 of the debug probe 14. The TPIU 35 may support two output modes, a double data rate clocked mode, using a parallel data output port with clock speed equal to the half of the system core clock and with a port width up to 4-bit (in the case of Cortex™-M3 or M4 core microcontrollers, while other microcontroller series may differ) and a SWV (Serial Wire Viewer) mode, using single-bit UART-like output through SWO.

Figures 4, 5:
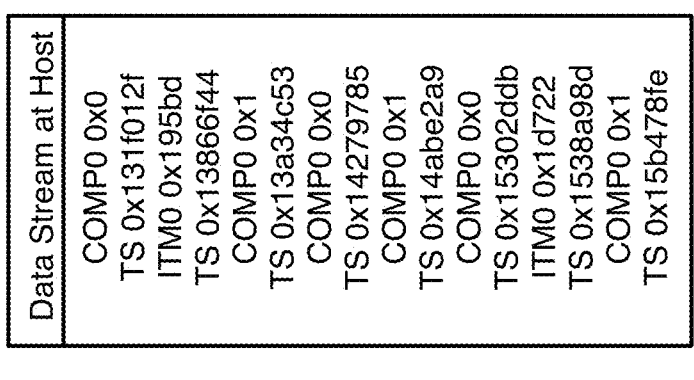
FIG. 4 is a diagram showing a sample data stream received by the host computer during debug operations of the debugging system of FIG. 2.
FIG. 5 is a graph showing the precise alignment between debug trace data and power acquisition samples achieved by the debugging system of FIG. 2.

Operation for the trace data to be synchronized with measures of current draw is as follows. Beginning at the start of operation, the host computer 12 instructs the debug probe 14 to send instructions to the microcontroller 20 to begin performing a debug trace, with a debug trace time stamp being enabled. These instructions are sent from the host computer 12 to the protocol manager 17 within the microcontroller 20, which in turn communicates the instructions to the debug port 36 via the SWDIO pin. The instructions are in turn written to the ITM 33, configuring the debug trace. The debug trace data flows from the DWT 32 to the ITM 33, to the TPIU 35, for transmission to the protocol manager 17 of the debug probe 14 over the SWO pin. The protocol manager 17 communicates the trace data packets to the host 12, with each trace data packet including the current debug trace time stamp. This debug trace operation is begun first, as can be seen in FIG. 5.

The host computer 12 then begins to periodically (e.g., every 100 ms) send synchronization requests SYNC REQ to the synchronization manager 16 of the debug probe 14, and the synchronization manager 16 retrieves the current power acquisition cycle number from the power acquisition circuit 15—each sample of PWR is sequentially numbered and the current power acquisition cycle number is the number of the current sample of PWR.

The synchronization manager 16 in turn sends the current power acquisition cycle number to the protocol manager 17, which assembles a synchronization request (including the current power acquisition cycle number) and transmits it to the debug port 16 within the microcontroller 20 via the SWDIO pin. Upon receipt of each synchronization request by the debug port 36, a request acknowledgement is sent back to the protocol manager 17 via the SWDIO pin.

The synchronization manager 16 measures the number of power consumption samples between sending the synchronization request and the acknowledgement. This result of this measurement is a measured latency, which is indicative of quality. The lower the latency, the more accurate the synchronization between the trace data and the power consumption samples; the higher the latency, the less accurate the synchronization between the trace data and the power consumption samples.

The synchronization requests and the acknowledgements thereof (collectively, synchronization recording) begins after the debug trace recording has begun, as shown in FIG. 3—notice that the sampling of the power consumption PWR is begun by the power acquisition block 15 shortly after the beginning of the synchronization recording, as shown in FIG. 3.

The synchronization request as received at the debug port 16 is then written to a register within the ITM 33. In response to this synchronization request, the ITM 35 generates an ITM message containing the current power acquisition cycle and an associated debug trace time stamp. This ITM message is passed from the ITM 33 to the TPIU 35, which communicates the ITM message to the protocol manager 17 of the debug probe 14 via the SWO pin. These ITM messages are communicated by the protocol manager 17 of the debug probe 14 to the host 12.

The protocol manager 17 receives the trace data packets as well as the ITM messages and passes them to the host 12 when received. This means that the data stream from the protocol manager 17 to the host 12 includes the ITM messages from the MCU 20 interleaved with the trace data packets. A sample data stream of the ITM messages (beginning with ITM0, indicating that the ITM message was generated at ITM channel 0) interleaved with the trace data packets (including time stamps TS and debug comparator output COMPO from debug comparator 0) is shown at FIG. 4). For example, observe ITM data packet ITM0 0x1295bd (with its associated time stamp TS 0x13866f44), interleaved between trace data packet COMPO 0x0 (with its associated time stamp TS 0x131f012f) and trade data packet COMPO 0x1 (with its associated time stamp TS 0x13a34c53).

The host 12 reads the trace data/ITM messages as received. Initially after startup, the host 12 utilizes linear regression to calculate the exact time stamp—start time—in the trace data where the power consumption sampling was started by the power acquisition block 16. A ratio between the sampling rate used by the power acquisition block 16 and the processing core 31 frequency (derived from the stream of debug trace time stamp) is calculated. The start point and ratio are used to align the power data and trace data waveforms. A sample aligned power data waveform and trace data waveform can be observed in FIG. 5, illustrating a low-latency case.

Figure 6:
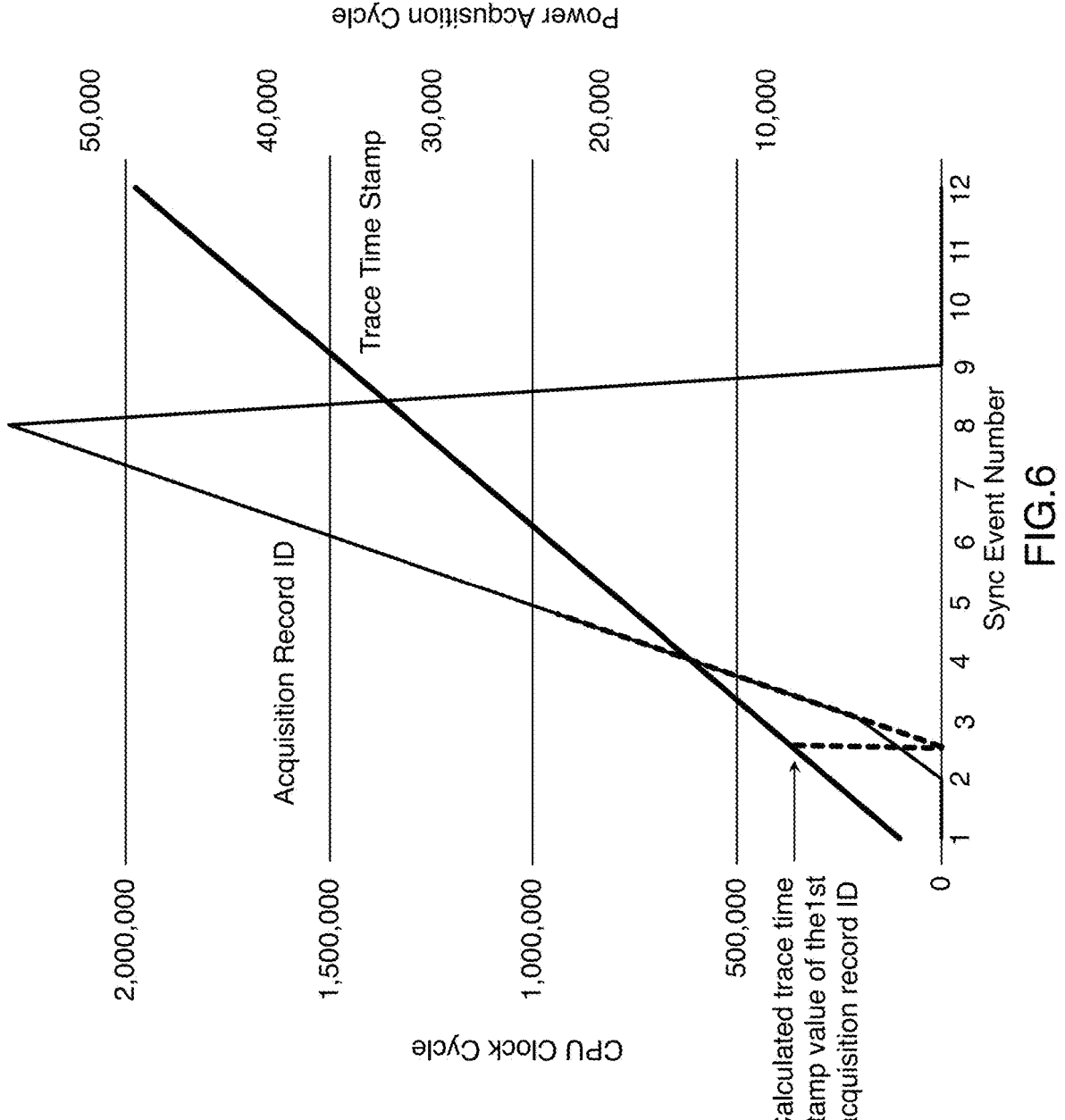
FIG. 6 is a graph showing the alignment between the power acquisition cycle number and debug trace time stamps achieved by the debugging system of FIG. 2 in performing alignment between debug trace data and power acquisition samples.

These operations performed can be observed in the graph FIG. 6. Notice that at the time of the sending of the first synchronization message by the debug probe 14 to the microcontroller 20, the power consumption sampling has not yet begun. This is because, as described above, the generation of the synchronization messages is performed prior to beginning of power consumption sampling. In the example of FIG. 6, by the sending of the third synchronization message, power consumption sampling has begun. Thereafter, for each synchronization message, information for the current power acquisition cycle number and the current processing core cycle is present, and alignment is performed as described above.

Assuming that the latency (described above) is low, such as in the example of FIG. 5, this alignment is sufficiently accurate to allow for precise inferences to be drawn between power consumption and the execution of certain processes/programs/pieces of code by the host 12.

Figure 7:
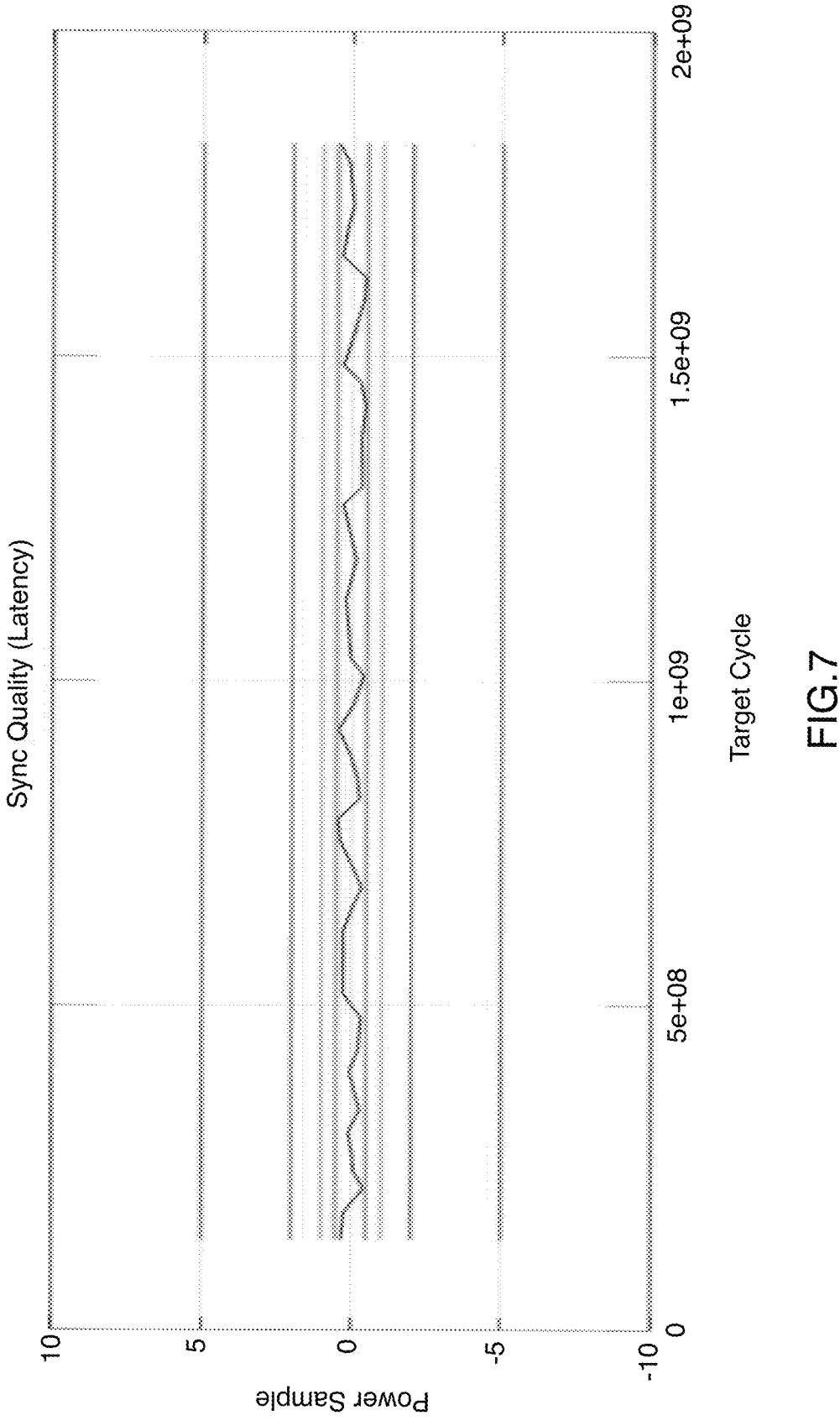
FIG. 7 is a graph showing the measure of synchronization quality achieved by the debugging system of FIG. 2.

Waveforms showing various aspects of operation are contained in FIGS. 7-8. For example, FIG. 7 shows a measure of the synchronization quality, this measure being derivable from latency as described above. As can be observed in this graph, synchronization quality is high, meaning that accurate alignment between the power data and trace data waveforms is achieved using the hardware and operating techniques described above. Finally, it is clear that modifications and variations may be made to what has been described and illustrated herein, without thereby departing from the scope of this disclosure, as defined in the annexed claims.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A method for synchronizing power consumption data with trace data in a microcontroller debugging system, the method comprising:

periodically sending, by a host device, synchronization requests to a synchronization manager of a debug probe;

retrieving, by the synchronization manager in response to each synchronization request, a current power acquisition cycle number from a power acquisition circuit of the debug probe, the current power acquisition cycle number corresponding to a current sample of power consumption of a microcontroller under test;

sending, by the synchronization manager, each synchronization request with the retrieved current power acquisition cycle number to a protocol manager of the debug probe;

transmitting, by the protocol manager, each synchronization request to a debug port of the microcontroller;

receiving, by the protocol manager, an acknowledgement of each synchronization request from the debug port of the microcontroller;

measuring, by the synchronization manager, a latency comprising a number of power consumption samples taken by the power acquisition circuit between sending each synchronization request and receiving a corresponding acknowledgement; and determining a synchronization quality based on the measured latency, wherein a lower latency indicates a higher synchronization quality and a higher latency indicates a lower synchronization quality.

2. The method of claim 1, further comprising:

writing, by the debug port upon receiving each synchronization request, the synchronization request to a register of an instrumentation trace macrocell (ITM) of the microcontroller;

generating, by the ITM in response to each synchronization request, an ITM message containing the current power acquisition cycle number and an associated debug trace time stamp; and transmitting, by a trace port interface unit (TPIU) of the microcontroller, each ITM message to the protocol manager of the debug probe.

3. The method of claim 2, further comprising:

receiving, by the protocol manager, trace data packets from the TPIU interleaved with the ITM messages; and transmitting, by the protocol manager, the trace data packets and the ITM messages to the host device.

4. The method of claim 3, further comprising:

calculating, by the host device using linear regression, a start time in the trace data corresponding to when power consumption sampling began based on the ITM messages and associated debug trace time stamps; and aligning, by the host device, power consumption data with trace data based on the calculated start time and a ratio between a sampling rate of the power acquisition circuit and a processing core frequency of the microcontroller derived from the debug trace time stamps.

5. The method of claim 1, further comprising:

beginning, by the host device prior to sending the periodic synchronization requests, a debug trace operation by instructing the debug probe to send configuration instructions to the microcontroller to initiate a debug trace with a debug trace time stamp enabled.

6. The method of claim 5, wherein the debug trace operation begins prior to the power acquisition circuit sampling power consumption of the microcontroller.

7. A debug probe for synchronizing power consumption data with trace data in a microcontroller debugging system, the debug probe comprising:

a power acquisition circuit configured to receive a power output from a host device, provide the power output to a microcontroller under test, and sample power consumption of the microcontroller;

a synchronization manager in communication with the power acquisition circuit and configured to receive synchronization requests from the host device and retrieve a current power acquisition cycle number from the power acquisition circuit in response to each synchronization request, the current power acquisition cycle number corresponding to a current sample of the power consumption; and a protocol manager in communication with the synchronization manager and configured to receive the synchronization requests and the current power acquisition cycle number from the synchronization manager, transmit each synchronization request to a debug port of the microcontroller, receive an acknowledgement of each synchronization request from the debug port, and transmit the acknowledgement to the synchronization manager.

8. The debug probe of claim 7, wherein the synchronization manager is further configured to measure a latency comprising a number of power consumption samples taken by the power acquisition circuit between sending each synchronization request and receiving a corresponding acknowledgement from the protocol manager.

9. The debug probe of claim 8, wherein the measured latency is indicative of a synchronization quality, with a lower latency indicating a higher synchronization quality and a higher latency indicating a lower synchronization quality.

10. The debug probe of claim 7, wherein the protocol manager is further configured to receive trace data packets and instrumentation trace macrocell (ITM) messages from a trace port interface unit (TPIU) of the microcontroller, the ITM messages containing the current power acquisition cycle number and an associated debug trace time stamp, and transmit the trace data packets and the ITM messages to the host device.

11. The debug probe of claim 10, wherein the protocol manager transmits the trace data packets and the ITM messages to the host device in a data stream with the ITM messages interleaved with the trace data packets.

12. The debug probe of claim 7, wherein the protocol manager is further configured to receive, from the host device, instructions to send configuration instructions to the microcontroller to initiate a debug trace with a debug trace time stamp enabled, and transmit the configuration instructions to the debug port of the microcontroller.

13. A system, comprising:

a microcontroller with a microprocessor;

a debug probe;

a host configured to:

send debug instructions to the debug probe at startup, initiating a debug trace within the microcontroller;

periodically send synchronization requests to the debug probe;

determine a trace data time stamp for a start of power signal sampling, derive a microprocessor frequency from trace data, determine a ratio between power signal sampling rate and microprocessor frequency, and align the trace data with power signal samples based on the ratio and trace data time stamp;

wherein the debug probe is configured to:

send debug instructions to the microcontroller;

receive and sample a power signal from the host, providing it to the microcontroller during different power acquisition cycles;

retrieve a current power acquisition cycle number and send an intermediate synchronization request to the microcontroller upon receiving each synchronization request;

receive messages from the microcontroller, including a current execution cycle number and associated time stamp; and send trace data, messages, and sampled power signal to the host; and wherein the microcontroller is configured to:

execute the debug trace, generating trace data with time stamps; and respond to intermediate synchronization requests by sending messages to the debug probe.

14. The system of claim 13, wherein the debug probe includes a power acquisition circuit that samples the power signal.

15. The system of claim 13, wherein the debug probe includes a protocol manager that:

retrieves the current power acquisition cycle number;

generates and sends the intermediate synchronization request to the microcontroller; and sends trace data, messages, and sampled power signal to the host.

16. The system of claim 15, wherein the protocol manager:

sends the intermediate synchronization request via a serial wire debug (SWD) protocol;

receives messages from the microcontroller via a UART protocol (SWO); and receives trace data from the microcontroller via the SWD protocol.

17. The system of claim 16, wherein the message is generated within an instrument trace macrocell (ITM) within the microcontroller.

18. The system of claim 15, wherein the debug probe includes a power acquisition circuit that samples the power signal, and the microcontroller sends a request acknowledgement upon receiving each intermediate synchronization request; and wherein the protocol manager measures a number of power acquisition cycles between sending each intermediate synchronization request and receiving the request acknowledgement to determine latency, which indicates accuracy of the alignment between trace data and power signal samples.

* * * * *